United States Patent
Jiang

(10) Patent No.: US 9,690,140 B2
(45) Date of Patent: Jun. 27, 2017

(54) 3D IMAGE DISPLAY DEVICE AND LIQUID CRYSTAL LENS PANEL DEVICE FOR THE SAME

(71) Applicant: SAMSUNG DISPLAY CO., LTD., Yongin, Gyeonggi-Do (KR)

(72) Inventor: Shuai Jiang, Yongin-si (KR)

(73) Assignee: SAMSUNG DISPLAY CO., LTD., Yongin, Gyeonggi-Do (KR)

( * ) Notice: Subject to any disclaimer, the term of this patent is extended or adjusted under 35 U.S.C. 154(b) by 5 days.

(21) Appl. No.: 14/505,048

(22) Filed: Oct. 2, 2014

(65) Prior Publication Data

US 2015/0323802 A1   Nov. 12, 2015

(30) Foreign Application Priority Data

May 9, 2014   (KR) .................. 10-2014-0055666

(51) Int. Cl.
*G02F 1/29* (2006.01)
*G02F 1/1337* (2006.01)
(Continued)

(52) U.S. Cl.
CPC ..... *G02F 1/133784* (2013.01); *C08G 73/105* (2013.01); *C08G 73/1042* (2013.01);
(Continued)

(58) Field of Classification Search
CPC .......... G02B 27/2214; G02F 1/133528; G02F 1/1337; G02F 1/137; G02F 2001/133749;
(Continued)

(56) References Cited

U.S. PATENT DOCUMENTS

| 7,058,252 B2 | 6/2006 | Woodgate et al. |
| 2007/0104895 A1* | 5/2007 | Hotaka .............. C09K 19/3003 |
| | | 428/1.1 |

(Continued)

FOREIGN PATENT DOCUMENTS

| KR | 1020060065331 | 6/2006 |
| KR | 1020090004006 | 1/2009 |

(Continued)

*Primary Examiner* — Sophie Hon
(74) *Attorney, Agent, or Firm* — F. Chau & Associates, LLC

(57) ABSTRACT

A liquid crystal lens panel device is provided. The liquid crystal lens panel device includes a first substrate, a second substrate, a bottom electrode, a top electrode, a first alignment layer, a lens liquid crystal layer, a common electrode, and a second alignment layer. The bottom electrode is disposed on the first substrate. The top electrode is disposed on the bottom electrode. The first alignment layer is disposed on the top electrode and has a first alignment direction. The lens liquid crystal layer is disposed on the first alignment layer and includes liquid crystal molecules. The common electrode is disposed on the lens liquid crystal layer. The second alignment layer is disposed on the common electrode and has a second alignment direction. The first alignment direction is the same as the second alignment direction. The second substrate is disposed on the second alignment layer.

10 Claims, 8 Drawing Sheets

(51) Int. Cl.
*G02B 27/22* (2006.01)
*C08G 73/10* (2006.01)
*G02F 1/139* (2006.01)
*G02F 1/1343* (2006.01)

(52) U.S. Cl.
CPC ..... *C08G 73/1071* (2013.01); *C08G 73/1078* (2013.01); *G02F 1/133723* (2013.01); *G02F 1/29* (2013.01); *G02B 27/2214* (2013.01); *G02F 1/1393* (2013.01); *G02F 1/134363* (2013.01); *G02F 2001/133749* (2013.01); *G02F 2001/294* (2013.01); *Y10T 428/1023* (2015.01)

(58) Field of Classification Search
CPC .. G02F 2001/13706; G02F /; Y10T 428/1005; Y10T 428/1018; Y10T 428/1023; B32B 2457/202; C08G 73/1042; C08G 73/105; C08G 73/1072; C08G 73/1078
USPC .................................................. 428/1.2–1.31
See application file for complete search history.

(56) References Cited

U.S. PATENT DOCUMENTS

| | | | | |
|---|---|---|---|---|
| 2011/0157498 A1* | 6/2011 | Kim | ................. | G02F 1/134309 349/15 |
| 2011/0228181 A1* | 9/2011 | Jeong | ................. | G02B 5/1842 349/15 |
| 2011/0292306 A1* | 12/2011 | Kim | ................. | G02B 27/2214 349/5 |
| 2012/0327351 A1* | 12/2012 | Fraval | ................. | G02B 27/22 349/139 |
| 2014/0024752 A1* | 1/2014 | Hsu | ................. | G02F 1/133723 524/104 |
| 2014/0249244 A1* | 9/2014 | Chappellet | ............ | C07C 229/60 522/176 |
| 2014/0342086 A1* | 11/2014 | Ibn-Elhaj | .......... | G02F 1/133365 427/162 |

FOREIGN PATENT DOCUMENTS

| | | | | |
|---|---|---|---|---|
| KR | 1020110078897 | | 7/2011 | |
| KR | 1020120091885 | | 8/2012 | |
| KR | 1020120115149 | | 10/2012 | |
| WO | WO 2013050121 A1 | * | 4/2013 | ........ C07C 229/60 |
| WO | WO 2013050122 A1 | * | 4/2013 | ........ C07C 229/60 |

* cited by examiner

FIG. 8

| Schematic view | ![Dianhydride structure](O=C-O-C=O ring with R₁)<br>Dianhydride(X mole) | ![Diamine structure](H₂N-benzene-NH₂ with OR₂ ester)<br>Diamine(Y mole) | <br>ODA(Z mole) |
|---|---|---|---|
| Rate | 50% | 10% | 40% |
|  | 50% | 15% | 35% |
| Ingredients setting | Benzene or Cyclopentane | aliphatic ring or Alkyl side chain | aromatic ring with solubility up unit |

3D IMAGE DISPLAY DEVICE AND LIQUID CRYSTAL LENS PANEL DEVICE FOR THE SAME

CROSS-REFERENCE TO RELATED APPLICATION

This application claims priority under 35 U.S.C. §119 to Korean Patent Application No. 10-2014-0055666, filed on May 9, 2014, in the Korean Intellectual Property Office, the disclosure of which is incorporated by reference herein in its entirety.

TECHNICAL FIELD

The present invention relates to a display device, and more particularly, to a three-dimensional (3D) image display device and a liquid crystal lens panel device for the same.

DISCUSSION OF THE RELATED ART

A three-dimensional (3D) stereoscopic image display device has been developed.

A method for displaying a 3D image (e.g., a 3D stereoscopic image) may use a binocular disparity to convey a sense of depth to a viewer. Binocular disparity may use a display device that sends distinct images to viewer's left and right eyes. The distinct images may feature a common scene observed from different angles. Thus, since the scenes from different angles are observed by the eyes of an observer, the observer may perceive a 3D effect.

Methods for displaying the 3D stereoscopic image may include a stereoscopic scheme and a nonstereoscopic scheme depending on whether glasses are used or not. The nonstereoscopic scheme may include a switchable panel type and a lenticular type according to the display device used for realizing a 3D image.

The switchable panel type may transform a 2D image into a 3D image, and may be either a switchable barrier type or a switchable liquid crystal lens type.

The switchable liquid crystal lens type uses a liquid crystal layer as a lens and may control phase differences by changing applied voltages on the liquid crystal layer. The liquid crystal layer may include liquid crystal molecules which rotate in various directions according to the electric fields applied to the liquid crystal molecules.

SUMMARY OF THE INVENTION

According to an exemplary embodiment of the present invention, a liquid crystal lens panel device is provided. The liquid crystal lens panel device includes a first substrate, a second substrate, a bottom electrode, a top electrode, a first alignment layer, a lens liquid crystal layer, a common electrode, and a second alignment layer. The second substrate is disposed in parallel with the first substrate. The bottom electrode is disposed on the first substrate. The top electrode is disposed on the bottom electrode. The first alignment layer is disposed on the top electrode. The first alignment layer has a first alignment direction. The lens liquid crystal layer is disposed on the first alignment layer and includes liquid crystal. The common electrode is disposed on the lens liquid crystal layer. The second alignment layer is disposed on the common electrode. The second alignment layer has a second alignment direction. The second substrate is disposed on the second alignment layer. The first alignment direction is the same as the second alignment direction.

In an exemplary embodiment, the first alignment direction and the second alignment direction may be slanted by about 81.2 degrees with respect to an extended direction of the top electrode.

In an exemplary embodiment, the liquid crystal molecules may have a pretilt angle that is less than about 3 degrees with respect to the first substrate.

In an exemplary embodiment, the liquid crystal lens panel device may further include a first polarizer and a second polarizer. The first polarizer may be disposed under the first substrate. The second polarizer may be disposed on the second substrate.

In an exemplary embodiment, directions of transmissive axes of the first and second polarizers may be the same as the first and second alignment directions.

In an exemplary embodiment, the bottom electrode and the top electrode may be disposed on different layers.

In an exemplary embodiment, the first and second alignment layers may each include a dianhydride compound as expressed in [Formula 1], a diamine compound as expressed in [Formula 2], and an oxydianiline (ODA) compound as expressed in [Formula 3].

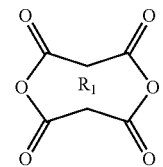

[Formula 1]

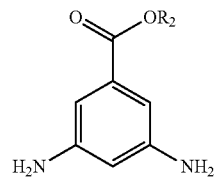

[Formula 2]

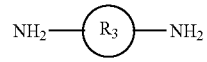

[Formula 3]

In an exemplary embodiment, R1 of [Formula 1] may be configured to include benzene or cyclopentane, R2 of [Formula 2] may be configured to include an aliphatic ring or an alkyl side chain, and R3 of [Formula 3] may be configured to include an aromatic ring with high solubility.

In an exemplary embodiment, the first and second alignment layers may be configured to include 50 wt % of the dianhydride compound, 10 wt % of the diamine-based compound, and 40 wt % of the oxydianiline (ODA).

In an exemplary embodiment, the first and second alignment layers may be configured to include 50 wt % of the dianhydride compound, 15 wt % of the diamine-based compound, and 35 wt % of the oxydianiline (ODA) compound.

In an exemplary embodiment, the lens liquid crystal layer may include liquid crystal molecules in an electrically controlled birefringence (ECB) mode having positive refractive anisotropy.

According to an exemplary embodiment of the present invention, a three-dimensional (3D) image display device is provided. The 3D image display device includes a display panel and a liquid crystal lens panel device. The display panel displays an image. The liquid crystal lens panel device is disposed on a front side of the display panel. The liquid crystal lens panel device is configured to operate in a two-dimensional (2D) mode for recognizing the image as a 2D image or a 3D mode for recognizing the image as a 3D image. The liquid crystal lens panel device includes a first substrate, a second substrate, a bottom electrode, a top electrode, a first alignment layer, a lens liquid crystal layer, a common electrode, and a second alignment layer. The second substrate is disposed in parallel with the first substrate. The bottom electrode is disposed on the first substrate. The top electrode is disposed on the bottom electrode. The first alignment layer is disposed on the top electrode. The first alignment layer has a first alignment direction. The lens liquid crystal layer is disposed on the first alignment layer and includes liquid crystal molecules. The common electrode is disposed on the lens liquid crystal layer. The second alignment layer is disposed on the common electrode. The second alignment layer has a second alignment direction. The first alignment direction is the same as the second alignment direction. The second substrate is disposed on the second alignment layer.

In an exemplary embodiment, the first alignment direction and the second alignment direction may be slanted by about 81.2 degrees with respect to an extended direction of the top electrode.

In an exemplary embodiment, the liquid crystal molecules may have a pretilt angle less than about 3 degrees with respect to the first substrate.

In an exemplary embodiment, the 3D image display device may further include a first polarizer and a second polarizer. The first polarizer may be disposed under the first substrate. The second polarizer may be disposed on the second substrate.

In an exemplary embodiment, directions of transmissive axes of the first and second polarizers may be the same as the first and second alignment directions.

In an exemplary embodiment, the first and second alignment layers may each include a dianhydride compound as expressed in [Formula 1], a diamine compound as expressed in [Formula 2], and an oxydianiline (ODA) compound as expressed in [Formula 3].

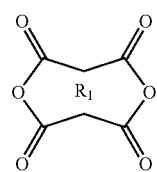

[Formula 1]

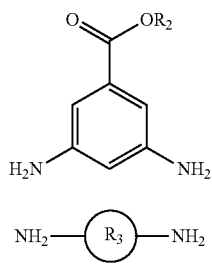

[Formula 2]

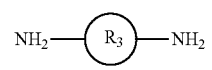

[Formula 3]

In an exemplary embodiment, R1 of [Formula 1] may be configured to include benzene or cyclopentane, R2 of [Formula 2] may be configured to include an aliphatic ring or an alkyl side chain, and R3 of [Formula 3] may be configured to include an aromatic ring with high solubility.

In an exemplary embodiment, the first and second alignment layers may be each configured to include 50 wt % of the dianhydride compound, 10 wt % of the diamine-based compound, and 40 wt % of the oxydianiline (ODA) compound.

In an exemplary embodiment, the first and second alignment layers may be each configured to include 50 wt % of the dianhydride compound, 15 wt % of the diamine-based compound, and 35 wt % of the oxydianiline (ODA) compound.

According to an exemplary embodiment of the present invention, a liquid crystal lens panel device is provided. The liquid crystal lens panel device includes a first substrate, a second substrate, a lens liquid crystal layer, a first alignment layer, and a second alignment layer. The second substrate is disposed in parallel with the first substrate. The lens liquid crystal layer is disposed between the first substrate and the second substrate. The lens liquid crystal layer includes liquid crystal molecules. The first alignment layer is disposed between the first substrate and the lens liquid crystal layer. The first alignment layer has a first alignment direction. The second alignment layer is disposed between the second substrate and the lens liquid crystal layer. The second alignment layer has a second alignment direction. The second substrate is disposed on the second alignment layer. The first alignment direction is the same as the second alignment direction. The liquid crystal molecules have a pretilt angle less than about 3 degrees with respect to the first substrate.

BRIEF DESCRIPTION OF THE DRAWINGS

A more complete appreciation of the present disclosure and many of the attendant aspects thereof will be readily obtained as the same becomes better understood by reference to the following detailed description when considered in connection with the accompanying drawings, wherein:

FIG. 8 shows constituent elements of an alignment layer according to an exemplary embodiment of the present invention.

DETAILED DESCRIPTION OF THE EMBODIMENTS

Figure 1:
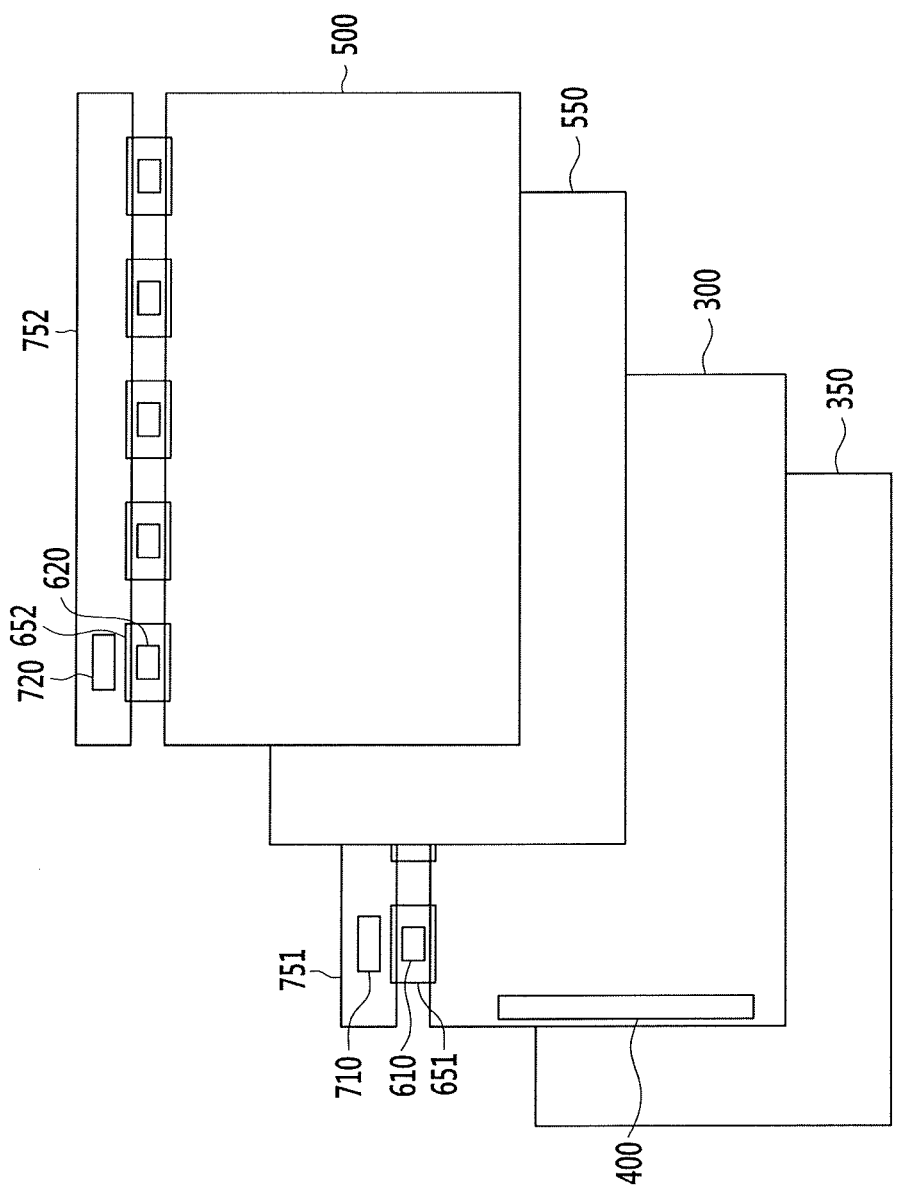
FIG. 1 shows a perspective view of a 3D image display device according to an exemplary embodiment of the present invention.

The present invention will be described more fully hereinafter with reference to the accompanying drawings, in which exemplary embodiments of the present invention are shown. However, the present invention may be embodied in various forms without departing from the spirit or scope of the present invention. Like reference numerals may designate like elements throughout the specification. An expression used in the singular encompasses an expression of the plural, unless it has a clearly different meaning in the context, and terms such as "first," "second," etc., may be used to distinguish one constituent element from another constituent element.

In the drawings, the thickness of layers, films, panels, regions, etc., may be exaggerated for clarity. It will be understood that when an element such as a layer, film, region, or substrate is referred to as being "on" another element, it can be directly on the other element or intervening elements may also be present.

Hereinafter, a 3D image display according to an exemplary embodiment of the present invention will be described with reference to FIG. 1.

FIG. 1 shows a perspective view of a 3D image display device according to an exemplary embodiment of the present invention.

Referring to FIG. 1, the 3D image display device includes a liquid crystal panel 300, a backlight unit 350, a gap glass 550, and a liquid crystal lens panel device 500.

The liquid crystal panel 300 for displaying a 2D image and the backlight unit 350 will now be described. The liquid crystal panel 300 and the backlight unit 350 may constitute a 2D image display device.

The liquid crystal panel 300 includes a lower substrate (e.g., a thin film transistor substrate), an upper substrate (e.g., a color filter substrate), and a liquid crystal layer.

Data lines and gate lines are formed to cross each other on the lower substrate and thereby, a plurality of pixels is defined. A thin film transistor (e.g., a switching element), a storage capacitor Cst, and a pixel electrode are formed on the pixels.

A first polarizer is disposed on a lower portion of the lower substrate.

Color filters corresponding to red, green, and blue colors are formed on the upper substrate, and a common electrode corresponding to the pixel electrode formed on the lower substrate is formed on the lower substrate.

A second polarizer is disposed on an upper portion of the upper substrate.

According to an exemplary embodiment of the present invention, the color filters may be provided on the lower substrate. The common electrode may be formed on the lower substrate. However, configurations of the liquid crystal panel 300 of the present invention are not limited thereto.

In the liquid crystal panel 300, the liquid crystal layer is provided between the lower substrate and the upper substrate, and the liquid crystal layer changes an alignment direction by an electric field formed between the common electrode and the pixel electrode, and controls an amount of light (e.g., intensity) transmitting through an upper polarizer (e.g., the second polarizer). Thus, various grays may be expressed. The electric field applied to the liquid crystal layer may be a horizontal electric field or a vertical electric field, and electrodes for generating the electric field may be formed on one or both of the upper substrate and the lower substrate.

To drive the liquid crystal panel 300, a signal controller 710, a data driving IC 610, and a gate driver 400 are included. The data driving IC 610 is provided on a flexible circuit board 651. The signal controller 710 is provided on a printed circuit board (PCB) substrate 751. The flexible circuit board 651 connects the PCB substrate 751 and the thin film transistor substrate of the liquid crystal panel 300.

The gate driver 400 alternately applies a gate-on voltage and a gate-off voltage to each gate line, and the gate-on voltage is sequentially applied to a plurality of gate lines. The gate driver 400 is formed on a partial region of the thin film transistor substrate of the liquid crystal panel 300, and is formed through substantially the same process as the pixel of the liquid crystal panel 300. However, the gate driver 400 may be formed as an additional integrated circuit (IC) chip according to an exemplary embodiment of the present invention.

The data driving IC 610 applies a data voltage to each data line. For example, the data driving IC 610 transforms the image data provided by the signal controller 710 into an analog data voltage, and applies the transformed analog data voltage to each data line.

The signal controller 710 processes an image signal provided from an external device, transmits image data to the data driving IC 610, and applies a control signal to the gate driver 400 and the data driving IC 610 to control the gate driver 400 and the data driving IC 610. The PCB substrate 751 on which the signal controller 710 is provided may be bent behind the backlight unit 350.

The backlight unit 350 is provided on a rear side of the liquid crystal panel 300.

The backlight unit 350 includes a light source and transmits the light provided by the light source to the liquid crystal panel 300. For example, the light source may be disposed to output the light toward the liquid crystal panel 300. In an exemplary embodiment of the present invention, the light source may be disposed to output the light in parallel with the lower side of the liquid crystal panel 300. When the light source outputs the light in parallel with the lower side of the liquid crystal panel 300, a light guide and a reflection sheet may be used to modify a direction of the light toward the liquid crystal panel 300.

The backlight unit 350 may further include optical sheets such as a diffuser sheet, a prism sheet, a luminance improving film, or the like.

In addition, a reflection sheet is provided at the bottom of the backlight unit 350 to reflect the light that is output from the backlight unit 350 to the upper side thereof so that the light may advance to the liquid crystal panel 300. The backlight unit 350 may include a film for reflecting a part of the light, and in this instance, the reflected light is reflected again on the reflection sheet to recycle the light and increase an efficiency of light.

In an exemplary embodiment of the present invention, the liquid crystal panel 300 and the backlight unit 350 may be used for the 2D image display device. In an exemplary embodiment of the present invention, a flat display panel (e.g., a plasma display panel, a light emitting diode (LED) display panel, or an electrophoretic display panel) may be used for the 2D image display device. When a self-emissive display panel is used, the backlight unit 350 may be omitted.

The 2D image display device displays a 2D image. In addition, the 2D image display device can display a 3D stereoscopic image because of the liquid crystal lens panel device 500. The liquid crystal lens panel device 500 selects and displays the 2D image and the 3D stereoscopic image according to an operation. The liquid crystal lens panel device 500 may be, for example, a switchable zone plate.

Referring to FIG. 1, the liquid crystal lens panel device 500 includes a lens controller 720 and an electrode voltage supplying IC 620. The lens controller 720 is provided on a PCB substrate 752, and the lens controller 720 controls the liquid crystal lens panel device 500 to operate depending on whether displaying a 2D image or a 3D image. For example, the lens controller 720 might not output any signal when displaying the 2D image, and may output a voltage to be applied to each of electrodes to the electrode voltage supplying IC 620 as a digital signal when displaying the 3D stereoscopic image. The electrode voltage supplying IC 620 transforms the digital voltage output signal of the lens controller 720 into an analog voltage signal and supplies the transformed analog voltage signal to each of the electrodes. The electrode voltage supplying IC 620 is provided on a flexible circuit board 652. The PCB substrate 752 on which the lens controller 720 is provided may be bent behind the backlight unit 350.

For example, the lens controller 720 of the liquid crystal lens panel device 500 may correspond to the signal controller 710 of the liquid crystal panel 300, and the electrode voltage supplying IC 620 of the liquid crystal lens panel device 500 may correspond to the data driving IC 610 of the liquid crystal panel 300. The 3D image display device according to an exemplary embodiment of the present invention might not include a configuration that corresponds to the gate driver 400 of the liquid crystal panel 300.

The liquid crystal lens panel device 500 and the liquid crystal panel 300 may be spaced apart by a predetermined distance to increase an image quality of the 3D stereoscopic image. In an exemplary embodiment of the present invention, the gap glass 550 may be provided between the liquid crystal lens panel device 500 and the liquid crystal panel 300 to maintain a distance.

The liquid crystal lens panel device 500 will be described in detail with reference to FIG. 2.

Figure 2:
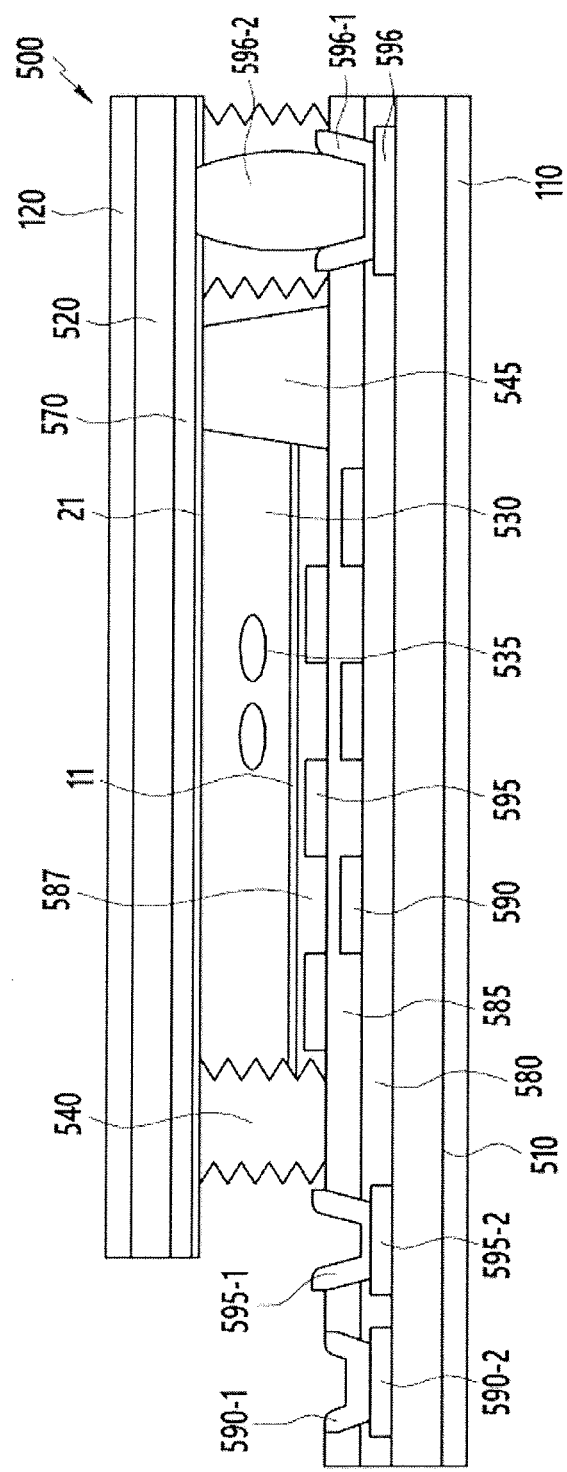
FIG. 2 shows a cross-sectional view of a liquid crystal lens panel device according to an exemplary embodiment of the present invention.

FIG. 2 shows a cross-sectional view of a liquid crystal lens panel device 500 according to an exemplary embodiment of the present invention.

The liquid crystal lens panel device 500 includes a lower substrate 510, an upper substrate 520, a lens liquid crystal layer 530 provided between the lower and upper substrates 510 and 520, and polarizers 110 and 120.

Voltage supplying wires 590-2 and 595-2 for supplying a voltage to bottom and top linear electrodes 590 and 595 that are provided on different layers are formed on the lower substrate 510. At least a part of the voltage supplying wires 590-2 and 595-2 may be exposed to an external side of the upper substrate 520

A common voltage supplying wire 596 for supplying a voltage to a common electrode 570 of the upper substrate 520 is provided on the lower substrate 510.

A first passivation layer 580 is provided on the voltage supplying wires 590-2 and 595-2 and the common voltage supplying wire 596.

A bottom linear electrode 590 is provided on the first passivation layer 580. The bottom linear electrode 590 is covered by a second passivation layer 585, and a top linear electrode 595 is provided on the second passivation layer 585.

The bottom linear electrode 590 and the top linear electrode 595 are extended in one direction and in parallel with each other. In an exemplary embodiment of the present invention, a portion (e.g., a boundary) of the bottom linear electrode 590 may overlap with or correspond to a portion (e.g., a boundary) of the top linear electrode 595 in a layout view. In an exemplary embodiment of the present invention, the boundary of the bottom linear electrode 590 may be formed in parallel with the boundary of the top linear electrode 595 with a predetermined interval therebetween.

A plurality of zones is formed on the liquid crystal lens panel device 500. Each (e.g., a single zone) of the plurality of zones includes a bottom linear electrode 590 and a top linear electrode 595. Each of the plurality of zones may correspond to one liquid crystal lens. Further, the bottom linear electrode 590 and the top linear electrode 595 are alternately provided in each of the plurality of zone.

A contact hole for exposing the voltage supplying wires 590-2 and 595-2 and the common voltage supplying wire 596 are formed in the first passivation layer 580, and the second passivation layer 585, and pads 590-1, 595-1, and 596-1 are formed through the contact hole. Voltages to be supplied to the bottom linear electrode 590 and the top linear electrode 595 are supplied to the pads 590-1 and 595-1 connected to the voltage supplying wires 590-2 and 595-2, respectively. The pad 596-1 connected to the common voltage supplying wire 596 is connected to a short unit 596-2 so that a common voltage may be applied to the common electrode 570. The short unit 596-2 may be provided inside a sealing member 540 in the liquid crystal lens panel device 500 according to an exemplary embodiment of the present invention as illustrated in FIG. 2.

The common electrode 570 is disposed under the upper substrate 520. The common electrode 570 receives a common voltage from the short unit 596-2.

First and second alignment layers 11 and 21 are provided on the inner most sides of the lower substrate 510 and the upper substrate 520, respectively. For example, the first alignment layer 11 is provided on the second passivation layer 585, and the second alignment layer 21 is provided on the common electrode 570.

The lens liquid crystal layer 530 including liquid crystal molecules 535 is provided between the first alignment layer 11 and the second alignment layer 21. For example, the lens liquid crystal layer 530 is filled within the upper substrate 520, the lower substrate 510, and the sealing member 540.

In an exemplary embodiment of the present invention, the lens liquid crystal layer 530 may include the liquid crystal molecules 535 in an electrically controlled birefringence (ECB) mode having positive refractive anisotropy. The first alignment layer 11 and the second alignment layer 21 are horizontal alignment layers and thus, the liquid crystal molecules 535 may be arranged in parallel with each other without rotation and in the horizontal direction between the first alignment layer 11 and the second alignment layer 21. For example, the liquid crystal molecules 535 in the ECB mode may be horizontally aligned when the voltage is not supplied thereto. In addition, the liquid crystal molecules 535 in the ECB mode may be perpendicularly aligned when the voltage is supplied thereto.

The first alignment layer 11 determines a disposal direction of the liquid crystal molecules 535 formed on the lower substrate 510, and the second alignment layer 21 determines a disposal direction of the liquid crystal molecules 535 formed on the upper substrate 520. For example, the first and second alignment layers 11 and 21 may align the liquid crystal molecules 535 in a uniform manner in one direction, and thus, the liquid crystal molecules 535 may serve to block or pass an incident polarized light. Accordingly, a liquid crystal alignment characteristic of the liquid crystal alignment layer (e.g., the first alignment layer 11 or the second alignment layer 21) and an electrical characteristic of a thin film may determine a display quality of a liquid crystal lens panel device.

An arrangement direction (e.g., the disposal direction) of the liquid crystal molecules 535 is changed by the electric fields generated by the top linear electrode 595, the bottom linear electrode 590, and the common electrode 570. In addition, the liquid crystal molecules 535 form a liquid crystal lens according to the changed arrangement direction. The liquid crystal lens may be formed for each zone.

When a 2D image is displayed, no voltage is applied to, for example, the top linear electrode 595, the bottom linear electrode 590, and the common electrode 570. In addition, when a 3D stereoscopic image is displayed, the liquid crystal lens panel device 500 supplies different voltages for respective positions of the linear electrodes 590 and 595 (e.g., the top linear electrode 595, the bottom linear electrode 590, and the common electrode 570). In addition, when the lens liquid crystal layer 530 is driven by the voltages, a phase difference provided by the lens liquid crystal layer 530 changes repetitively between a largest value (or a maximum value) and a smallest value (or a minimum value) to configure a liquid crystal lens.

In addition, as a difference (e.g., in intensity or direction) of electric fields (according to different positions of electrodes to which voltages are applied) is increased, the liquid crystal molecules 535 between the top and bottom linear electrodes 590 and 595 and the common electrode 570 are further rotated in a direction that is opposite to a rubbing direction of the alignment layer. Thus, a liquid crystal rotation time may be increased and a response speed may be slower.

The first polarizer 110 may be included under the lower substrate 510. The second polarizer 120 may be disposed on the upper substrate 520. For example, the first polarizer 110 is provided on a rear side (or a lower side) of the liquid crystal lens panel device 500, and the second polarizer 120 is provided on a front side (or an upper side) of the liquid crystal lens panel device 500.

The first polarizer 110 and the second polarizer 120 can selectively absorb or penetrate an incident light according to a direction of the incident light.

Although, the ECB mode may be used to drive liquid crystal according to an exemplary embodiment of the present invention, this is only one of various exemplary embodiments of the present invention. For example, an in plane switching (IPS) mode or a patterned vertical alignment (PVA) mode may be applied to drive the liquid crystal according to an exemplary embodiment of the present invention.

The first and second alignment layers 11 and 21, the first and second polarizers 110 and 120, and the liquid crystal molecules 535 for increasing a response speed according to an exemplary embodiment of the present invention will be described with reference to FIG. 3 to FIG. 6.

Figure 3:
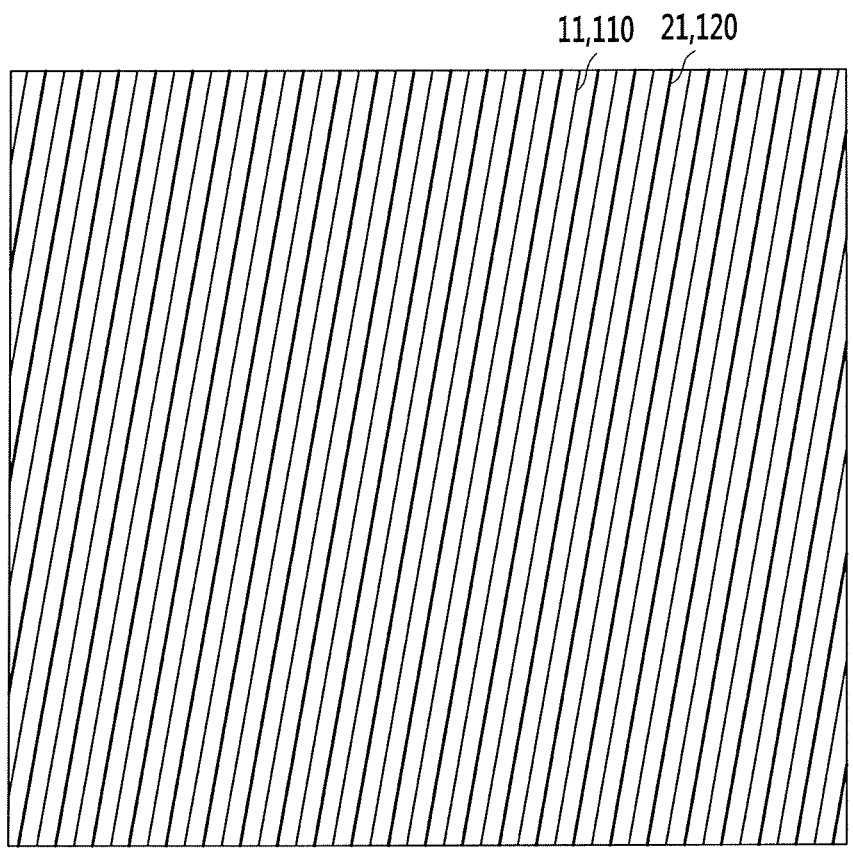
FIG. 3 shows a rubbing direction of an alignment layer and a transmissive axis of a polarizer according to an exemplary embodiment of the present invention.
Figure 4:
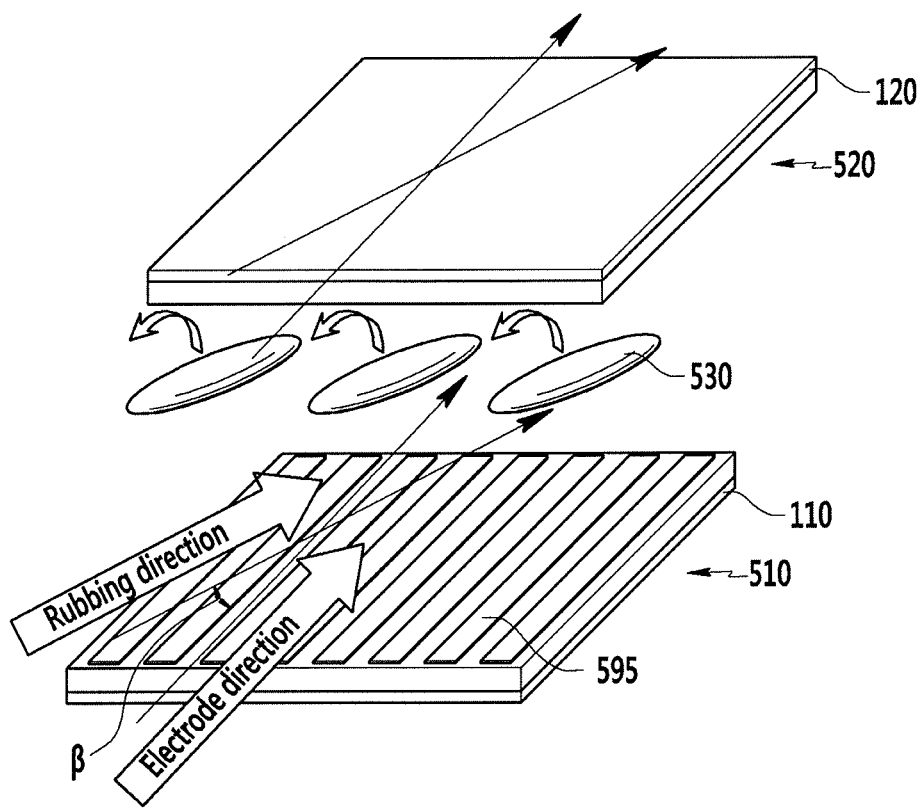
FIG. 4 shows a rubbing direction of an alignment layer and a transmissive axis of a polarizer according to an exemplary embodiment of the present invention.

FIG. 3 and FIG. 4 show a rubbing direction of an alignment layer and a transmissive axis of a polarizer according to an exemplary embodiment of the present invention.

Referring to FIG. 3 and FIG. 4, the first alignment layer 11 includes a first rubbing direction, and the second alignment layer 21 includes a second rubbing direction.

In this instance, the first rubbing direction of the first alignment layer 11 is the same as the second rubbing direction of the second alignment layer 21. For example, the first alignment layer 11 is formed to be parallel with the second alignment layer 21.

Referring to FIG. 4, the first rubbing direction of the first alignment layer 11 is slanted by a first angle β (e.g., 81.2 degrees) with respect to an extended direction of the top linear electrode 595. The second rubbing direction of the second alignment layer 21 is slanted by the first angle β (e.g., 81.2 degrees) with respect to the extended direction of the top linear electrode 595.

The transmissive axes of the first polarizer 110 and the second polarizer 120 have the same direction as the rubbing directions of the first and second alignment layers 11 and 21. For example, the transmissive axes of the first polarizer 110 and the second polarizer 120 have the same directions as the rubbing directions of the first and second alignment layers 11 and 21 and are slanted by the first angle 13 (e.g., 81.2 degrees) with respect to the extended direction of the top linear electrode 595.

As described above, the rubbing directions of the first and second alignment layers 11 and 21 and the transmissive axes of the first and second polarizers 110 and 120 are slanted by the first angle β (e.g., 81.2 degrees) with respect to the extended direction of the top linear electrode 595, the liquid crystal molecules 535 may quickly find a rotation direction to be rotated, and thus, a response speed may be increased.

Figure 5:
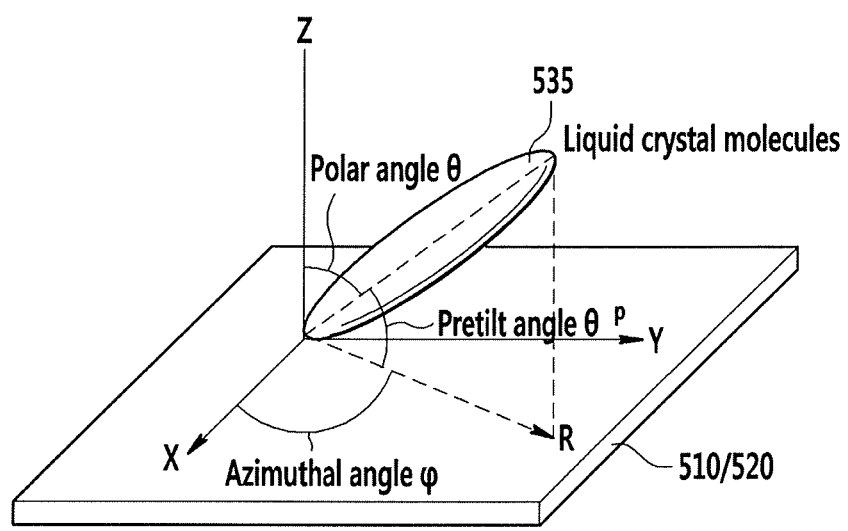
FIG. 5 shows a relative position relationship of liquid crystal molecules and a substrate.
Figure 6:
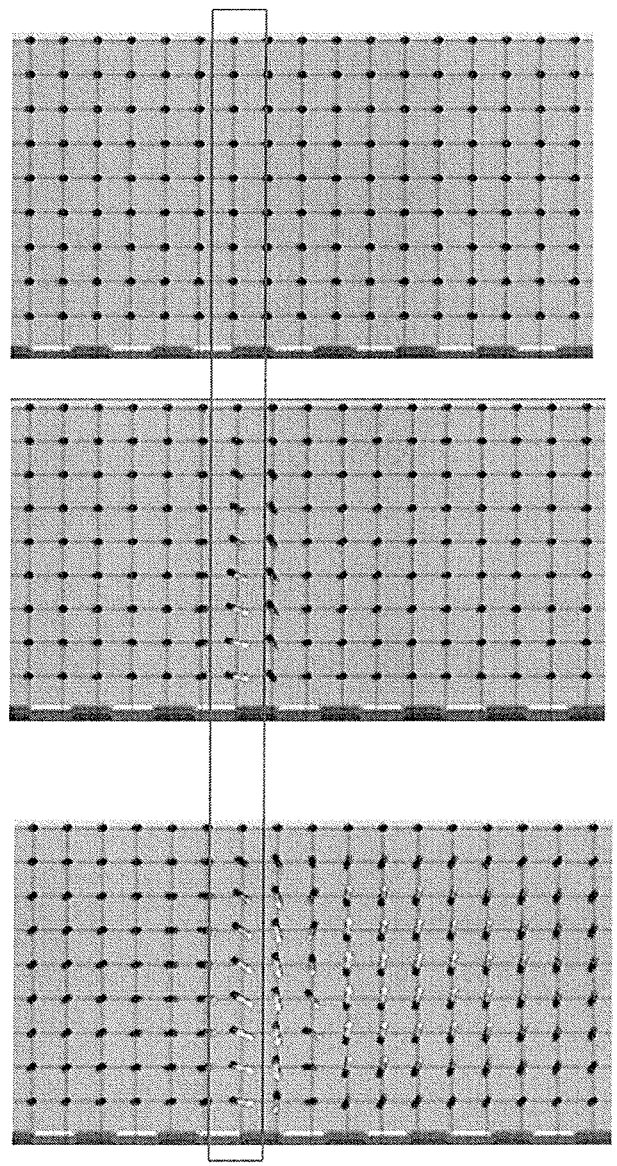
FIG. 6 shows a simulation drawing for a pretilt angle of liquid crystal molecules according to an exemplary embodiment of the present invention.
Figure 7:
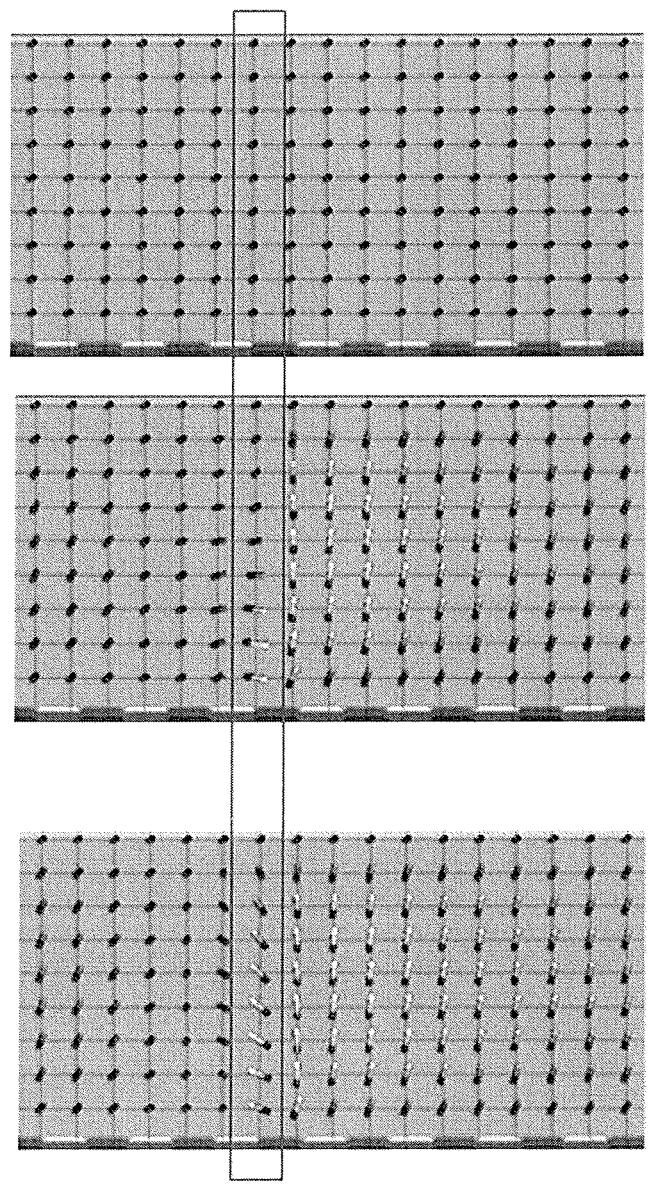
FIG. 7 shows a simulation drawing for a pretilt angle of liquid crystal molecules according to an exemplary embodiment of the present invention.

FIG. 5 shows a relative position relationship of liquid crystal molecules and a substrate, and FIG. 6 and FIG. 7 show simulation drawings for a pretilt angle of liquid crystal molecules according to an exemplary embodiment of the present invention.

Referring to FIG. 5, the liquid crystal molecules 535 are disposed on the substrates 510 and 520. Here, X-axis (e.g., called an easy axis because the X-axis is a direction in which liquid crystal is controllable) is a rubbing direction of the first and second alignment layers 11 and 12, and Y-axis is a direction of the linear electrode (e.g., the top linear electrode 595 or the bottom linear electrode 590). An azimuthal angle ($\Phi$) is an angle by which the liquid crystal molecules 535 are separated from the X-axis, for example, when the liquid crystal molecules 535 are projected on the substrates 510 and 520. A pretilt angle ($\theta p$) is an angle by which the liquid crystal molecules 535 are separated from the substrates 510 and 520 (e.g., the XY planes). A polar angle ($\theta$) is an angle by which the liquid crystal molecules 535 are slanted from Z-axis.

The liquid crystal molecules 535 determine an azimuthal angle ($\Phi$), a pretilt angle ($\theta p$), and a polar angle ($\theta$) according to a rubbing direction of the first and second alignment layers 595 and 590. For example, the rubbing direction of the first and second alignment layers 595 and 590 and the pretilt angle ($\theta p$) may determine a response speed of the liquid crystal.

Referring to FIG. 6 and FIG. 7, black dots represent heads of the liquid crystal molecules 535, and white portions indicate tails of the liquid crystal molecules 535. First through third drawings in a downward direction indicate a rotation direction of the liquid crystal molecules 535 with respect to time when a voltage is applied.

FIG. 6 shows a time taken until liquid crystal molecules 535 reach a stable state in response to an applied voltage when a pretilt angle ($\theta p$) of the liquid crystal molecules 535 is greater than 0 degree and less than 3 degrees. For example, the stable state is a state in which the liquid crystal molecules 535 are no longer rotated. FIG. 7 shows a time taken until liquid crystal molecules 535 reach a stable state in response to an applied voltage when a pretilt angle ($\theta p$) of the liquid crystal molecules 535 is greater than 4 degrees.

The first drawing corresponds to a case in which no voltage is applied and the liquid crystal molecules 535 are arranged in the horizontal direction on the substrates 510 and 520 and in parallel with each other without rotation in the ECB mode. When a voltage is applied to, for example, the top linear electrode 595, the bottom linear electrode 590, and the common electrode 570, the liquid crystal molecules 535 are rotated. For example, referring to FIG. 6, when the pretilt angle (θp) is greater than 0 degree and less than 3 degrees, the tail portions (e.g., white dots) of the liquid crystal molecules 535 are headed in the same direction, the tail portions of liquid crystal molecules 535 have the same rotation direction as each other, and thus, the stabilization time becomes about 70 to 90 msec. Referring to FIG. 7, when the pretilt angle (θp) is greater than 4 degrees, the tail portions of the liquid crystal molecules 535 are headed in opposite directions to each other in the second drawing and the third drawing, the tail portions of the liquid crystal molecules 535 have different directions from each other, and the stabilization time is increased to about 160 msec.

For example, a rotation time of the liquid crystal molecules 535 may be reduced and a response speed of the liquid crystal may be made faster by forming a pretilt angle (θp) of the liquid crystal molecules 535 to be greater than 0 degree and less than 3 degrees.

FIG. 8 shows constituent elements of an alignment layer according to an exemplary embodiment of the present invention.

Referring to FIG. 8, the first and second alignment layers 11 and 21 are configured by including a dianhydride compound expressed in [Formula 1], a diamine compound expressed in [Formula 2], and/or an oxydianiline (ODA) compound expressed in [Formula 3].

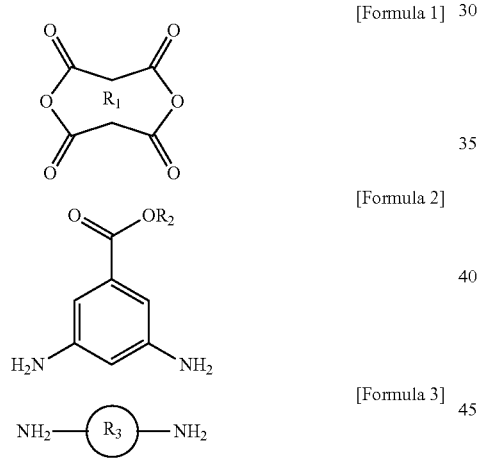

Here, R1 of [Formula 1] is configured to include benzene or cyclopentane, R2 of [Formula 2] is configured to include an aliphatic ring or an alkyl side chain, and R3 of [Formula 3] is configured to include an aromatic ring with high solubility.

For example, the first and second alignment layers 11 and 21 may be each configured with 50% of the dianhydride-based compound, 10% of the diamine-based compound, and 40% of the oxydianiline (ODA) compound with respect to a weight of the alignment layer, or the first and second alignment layers may be each configured with 50% of the dianhydride-based compound, 15% of the diamine-based compound, and 35% of the oxydianiline (ODA) compound with respect to the weight of the alignment layer.

By forming the alignment layer according to an exemplary embodiment of the present invention, the pretilt angle (θp) of the first and second alignment layers 11 and 21 may be formed to be greater than 0 degree and less than 2 degrees thereby increasing the response speed.

While the present invention has been described with reference to exemplary embodiments thereof, it will be understood that the present invention is not limited to the disclosed embodiments.

What is claimed is:

1. A liquid crystal lens panel device comprising:
a first substrate;
a second substrate disposed in parallel with the first substrate;
a bottom electrode disposed on the first substrate;
a top electrode disposed on the bottom electrode;
a first alignment layer disposed on the top electrode and having a first alignment direction;
a lens liquid crystal layer disposed on the first alignment layer, the lens liquid crystal layer including liquid crystal molecules,
wherein the liquid crystal molecules have a pretilt angle that is less than 3 degrees with respect to the first substrate;
a second alignment layer disposed on the liquid crystal layer and having a second alignment direction; and
a common electrode disposed on the second alignment layer,
wherein the bottom electrode and the top electrode are extended in one direction and in parallel with each other, and
a boundary of the bottom electrode corresponds to a boundary of the top electrode in a layout view, and
wherein the second substrate is disposed on the second alignment layer,
wherein the first alignment direction is the same as the second alignment direction,
wherein the first and second alignment layers each include a dianhydride compound as expressed in [Formula 1], a diamine compound as expressed in [Formula 2], and an oxydianiline (ODA) compound as expressed in [Formula 3]:

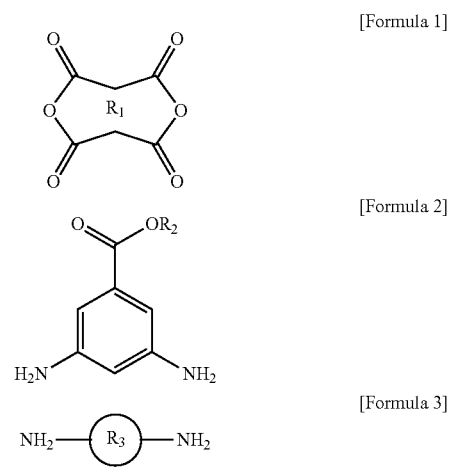

wherein R1 is benzene, cyclopentane, or a combination thereof; R2 is an aliphatic ring, aliphatic chain, or a combination thereof; and R3 is a substituted or unsubstituted oxydiphenyl, and
wherein the first and second alignment layers are each configured to include 50 wt % of the dianhydride compound, 10 wt % of the diamine-based compound, and 40 wt % of the oxydianiline (ODA) compound, or the first and second alignment layers are each configured to include 50 wt % of the dianhydride compound, 15 wt % of the diamine-based compound, and 35 wt % of the oxydianiline (ODA) compound.

2. The liquid crystal lens panel device of claim 1, wherein the first alignment direction and the second alignment direction are slanted by about 81.2 degrees with respect to an extended direction of the top electrode.

3. The liquid crystal lens panel device of claim 1, further comprising:
a first polarizer disposed under the first substrate;
and a second polarizer disposed on the second substrate.

4. The liquid crystal lens panel device of claim 3, wherein directions of transmissive axes of the first and second polarizers are the same as the first and second alignment directions.

5. The liquid crystal lens panel device of claim 1, wherein the bottom electrode and the top electrode are disposed on different layers.

6. The liquid crystal lens panel device of claim 1, wherein the lens liquid crystal layer includes liquid crystal molecules in an electrically controlled birefringence (ECB) mode having positive refractive anisotropy.

7. A three-dimensional (3D) image display device comprising:
a display panel for displaying an image; and
a liquid crystal lens panel device disposed on a front side of the display panel, and the liquid crystal lens panel device being configured to operate in a two-dimensional (2D) mode for recognizing the image as a 2D image or a 3D mode for recognizing the image as a 3D image, wherein the liquid crystal lens panel device comprises:
a first substrate;
a second substrate disposed in parallel with the first substrate;
a bottom electrode disposed on the first substrate;
a top electrode disposed on the bottom electrode;
a first alignment layer disposed on the top electrode and having a first alignment direction;
a lens liquid crystal layer disposed on the first alignment layer, the lens liquid crystal layer including liquid crystal molecules,
wherein the liquid crystal molecules have a pretilt angle that is less than 3 degrees with respect to the first substrate;
a second alignment layer disposed on the lens liquid crystal layer and having a second alignment direction; and
a common electrode disposed on the second alignment layer,
wherein the bottom electrode and the top electrode are extended in one direction and in parallel with each other, and
a boundary of the bottom electrode corresponds to a boundary of the top electrode in a layout view, and wherein the first alignment direction is the same as the second alignment direction,
wherein the second substrate is disposed on the second alignment layer,
wherein the first and second alignment layers each include a dianhydride compound as expressed in [Formula 1], a diamine compound as expressed in [Formula 2], and an oxydianiline (ODA) compound as expressed in [Formula 3]:

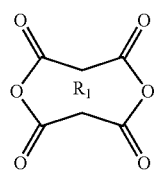

[Formula 1]

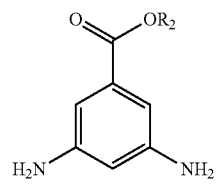

[Formula 2]

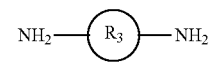

[Formula 3]

wherein R1 is benzene, cyclopentane, or a combination thereof; R2 is an aliphatic ring, aliphatic chain, or a combination thereof; and R3 is a substituted or unsubstituted oxydiphenyl, and
wherein the first and second alignment layers are each configured to include 50 wt % of the dianhydride compound, 10 wt % of the diamine-based compound, and 40 wt % of the oxydianiline (ODA) compound, or the first and second alignment layers are each configured to include 50 wt % of the dianhydride compound, 15 wt % of the diamine-based compound, and 35 wt % of the oxydianiline (ODA) compound.

8. The 3D image display device of claim 7, wherein the first alignment direction and the second alignment direction are slanted by about 81.2 degrees with respect to an extended direction of the top electrode.

9. The 3D image display device of claim 7, further comprising:
a first polarizer disposed under the first substrate; and
a second polarizer disposed on the second substrate.

10. The 3D image display device of claim 9, wherein directions of transmissive axes of the first and second polarizers are the same as the first and second alignment directions.

* * * * *